US012762570B2

(12) United States Patent
Dubois et al.

(10) Patent No.: US 12,762,570 B2
(45) Date of Patent: Oct. 13, 2026

(54) COMPONENT, DOMESTIC APPLIANCE, SYSTEM AND METHOD

(71) Applicant: BSH Hausgeräte GmbH, Munich (DE)

(72) Inventors: Frederic Dubois, Trostberg (DE); Peter Oberauer, Nußdorf (DE); Anja Schueck, Traunreut (DE); Christine Thaller, Waging (DE); Frank Wirsing, Fridolfing (DE)

(73) Assignee: BSH Hausgeräte GmbH, Munich (DE)

( * ) Notice: Subject to any disclaimer, the term of this patent is extended or adjusted under 35 U.S.C. 154(b) by 618 days.

(21) Appl. No.: 18/271,682

(22) PCT Filed: Mar. 2, 2022

(86) PCT No.: PCT/EP2022/055258
§ 371 (c)(1),
(2) Date: Jul. 11, 2023

(87) PCT Pub. No.: WO2022/200003
PCT Pub. Date: Sep. 29, 2022

(65) Prior Publication Data

US 2024/0062220 A1 Feb. 22, 2024

(30) Foreign Application Priority Data

Mar. 23, 2021 (DE) ..................... 10 2021 202 845.4

(51) Int. Cl.
*G06F 16/00* (2019.01)
*A47J 37/00* (2006.01)
*G06Q 30/016* (2023.01)

(52) U.S. Cl.
CPC ............ *G06Q 30/016* (2013.01); *A47J 37/00* (2013.01)

(58) Field of Classification Search
CPC ......... G06F 16/00; G06Q 30/016; A47J 37/00
See application file for complete search history.

(56) References Cited

U.S. PATENT DOCUMENTS

| | | | | |
|---|---|---|---|---|
| 7,595,466 B2 * | 9/2009 | Huber | F24C 7/083 219/460.1 |
| 2003/0023515 A1 * | 1/2003 | Kon | G06Q 30/02 705/26.62 |
| 2020/0048009 A1 | 2/2020 | Moore | |
| 2022/0052869 A1 * | 2/2022 | Garbosa | H04L 12/2829 |

(Continued)

FOREIGN PATENT DOCUMENTS

| | | |
|---|---|---|
| DE | 102008004995 A1 | 12/2008 |
| DE | 102009002864 A1 | 11/2010 |
| DE | 102012015893 A1 | 2/2014 |

(Continued)

OTHER PUBLICATIONS

Report of Examination EP22710039.3 dated Nov. 10, 2025.
International Search Report PCT/EP2022/055258 dated Jun. 10, 2022.

*Primary Examiner* — Cheryl Lewis
(74) *Attorney, Agent, or Firm* — Michael E. Tschupp; Andre Pallapies; Brandon G. Braun

(57) ABSTRACT

A component for use with a household appliance includes an optical indication element arranged in a non-detachable manner on the component and comprising coded information relating to the component. The optical indication element is designed for detection by an optical detection facility.

19 Claims, 3 Drawing Sheets

(56) References Cited

U.S. PATENT DOCUMENTS

2023/0085049 A1* 3/2023 Farrel .................. F24C 15/024
126/273 R

FOREIGN PATENT DOCUMENTS

| | | | |
|---|---|---|---|
| DE | 102015013567 | A1 | 4/2017 |
| TW | M590418 | U | 2/2020 |
| WO | 2018193348 | A1 | 10/2018 |

* cited by examiner

COMPONENT, DOMESTIC APPLIANCE, SYSTEM AND METHOD

CROSS-REFERENCES TO RELATED APPLICATIONS

This application is the U.S. National Stage of International Application No. PCT/EP2022/055258, filed Mar. 2, 2022, which designated the United States and has been published as International Publication No. WO 2022/200003 A1 and which claims the priority of German Patent Application, Serial No. 10 2021 202 845.4, filed Mar. 23, 2021, pursuant to 35 U.S.C. 119 (a)-(d).

The contents of International Application No. PCT/EP2022/055258 and German Patent Application, Serial No. 10 2021 202 845.4 are incorporated herein by reference in their entireties as if fully set forth herein.

BACKGROUND OF THE INVENTION

The present invention relates to a component for use with a household appliance, a household appliance with such a component, a system with a component and a storage facility and a method for providing information material relating to a component of a household appliance.

During the service life of a household appliance, it may occur that the user requires detailed information relating to the household appliance, for instance in order to obtain a suitable accessory and/or replacement parts for the respective household appliance, or also in order to carry out a service measure, such as cleaning and/or repair work, on the relevant household appliance. This information is typically provided by operating instructions which are enclosed with the household appliance upon sale. These operating instructions may however get lost. It is then very difficult for the user to obtain the correct information.

One possibility of resolving this problem is to provide the operating instructions digitally, for instance by way of a server on the Internet. The correct operating instructions can then be called up or provided using a type number or device number, for instance. However, it is often not easy for the user to determine the correct type number or device number.

The applicant's DE 10 2012 015 893 discloses a method for transmitting information relating to a household appliance to a receiver, with which the information is displayed on the household appliance, with which the displayed information is received by a user device and with which the received information is transferred electronically from the user device to the receiver. The information is provided in the form of a QR code, for instance, which is shown on a display apparatus of the household appliance, and which is detected by means of the user device.

BRIEF SUMMARY OF THE INVENTION

Against this background, an object of the present invention is to improve the provision of information relating to a component of a household appliance or the household appliance to a user of the component. The information which is provided in this regard can relate in particular to the household appliance as such, an operation of the household appliance and/or also a component of the household appliance or an accessory part for use with the household appliance.

According to a first aspect, a component is proposed for use with a household appliance, in particular a household cooking appliance. The component has an optical indication element arranged in a non-detachable manner on the component, wherein the optical indication element comprises an item of coded information relating to the component and wherein the optical indication element can be detected by means of an optical detection facility.

This component has the advantage that the coded information can be permanently provided by way of the optical indication element. The coded information can comprise for instance an appliance number, a serial number, a part number or such like in coded form. Preferably, the coded information further comprises a reference to an external resource. The external resource can comprise a user handbook, which can also exist in digital form and can contain animations, for instance. The external resource can also be a server which can be reached by way of a network, in particular the Internet, wherein the reference comprises for instance a link to the server and/or to the item of information relating to the component and stored on the server.

The component is determined for use with the household appliance. This can involve a component which is used during the manufacture of the household appliance and which is built into or onto the household appliance. In this regard, the component can be connected to the household appliance in a detachable or non-detachable manner. Furthermore, the component can be a replacement part or an accessory part for the household appliance. During intended use, the component with the optical indication element can be arranged on the household appliance so that the optical indication element is only visible when the component and/or a further component of the household appliance is pivoted, such as for instance a door of an oven or suchlike. The component can further be a combined component which itself comprises a number of individual components which are merged to form the component. In this regard, only one of the number of components can have the optical indication element and/or a number of components can have the optical indication element and/or different optical indication elements. Furthermore, the optical indication element can extend across a number of individual components, wherein the number of individual components have in each case one part of the optical indication element and the optical indication element develops overall as a result of merging the component.

The fact that the indication element is arranged in a non-detachable manner on the component is understood here to mean that the indication element cannot be separated from the component without damaging the component and/or the indication element. The indication element can therefore not be separated from the component during intended use of the component. In particular, the optical indication element is not designed as a sticker.

The indication element is embodied in particular to be robust, in other words so that it is not destroyed during intended use of the component. In particular, the indication element can also be embodied to be robust so that it is not destroyed even with improper use or treatment of the component, in particular during cleaning with unsuitable chemical and/or mechanical cleaning means. This is advantageous in that the coded information can even be determined by means of detecting the indication element when the component was handled improperly.

The optical indication element is embodied in particular such that it withstands the environmental conditions which are typical during use of the respective component, in particular remains undamaged for a longer period of time. This is understood for instance to mean that during this time coded information can be detected correctly. The optical indication element is preferably embodied such that it is retained for an expected service life of the household appliance. The environmental conditions comprise for instance high and/or low temperatures and temperature fluctuations, for instance in a range of −50° C. to +800° C., high air humidity, contamination with food residues and/or operating means and so on and so forth.

In terms of the spatial directions, the indication element represents the coded information one-dimensionally (such as a bar code), two-dimensionally (such as a QR code) or also three-dimensionally (such as a hologram). The indication element can also represent the coded information in a spectral dimension. In other words, with different wavelengths, for instance illumination and/or read-out wavelengths, the indication element has a different information content. The optical indication element can have the coded information in a broad spectral range, which extends for instance from the infrared spectral range as far as the ultraviolet spectral range. In particular, the indication element need not necessarily comprise an information content in the visual spectral range. The indication element would then be invisible to a user, for instance.

The coded information can be determined by the optical indication element being detected with a suitable reader, in particular an optical detection facility. For instance, the optical indication element is recorded with a camera and the coded information is extracted from the recorded image. To this end a suitable decoding method can in particular be used, which is implemented for instance using hardware and/or software in the form of an application, for instance. In embodiments, the decoding can be carried out by the optical detection facility. The optical detection facility can also be embodied as a laser scanner or suchlike. In other words the indication element is scanned.

The indication element represents the coded information in particular permanently unchanged. In other words, the indication element is not suited to representing a different coded item of information at different points in time.

The term "coded information" is understood here to mean in particular that the information which comprises the indication element is not present in a document, which can be read by a person, with direct significance. In order to decode the coded information, a unique assignment table or the code, according to which the coded information was coded, is used, for instance.

The coded information can include numbers, letters, characters, images, lines, dots, geometric shapes and so on and so forth.

According to one embodiment of the component, the optical indication element is manufactured using a laser engraving method, a stylus, needle or dot-matrix method, an embossing method, an inkjet printing method, a screen printing method and/or a cutting method.

The optical indication element is manufactured in particular by material degradation and/or a material application and/or a material deformation and/or a material compaction of the component.

Advantageously, the laser engraving method, in which a structure of the component, for instance a mesh structure, is permanently changed. In this regard, the optical indication element is written directly into the surface of the component.

The optical indication element is connected in particular in a material bonded manner with the component provided the optical indication element has a different material to the component at the position on which the optical indication element is arranged. The method can also be referred to as the inkjet printing method.

When an embossing method or a cutting method is used such as boring, grinding or milling, the indication element is advantageously integrated into the component.

The cited methods can in particular also be combined with one another, in other words an embossed structure is additionally processed by means of laser engraving, for instance, in order to provide the indication element. With different methods, a different information content can also be attached here in each case to the indication element, so that further dimensions result, for which the coded information can be provided.

Moreover, the most suitable method can be used for different materials in each case. The most suitable method is in particular the method which provides the optical indication element with a high durability and with as minimal costs as possible. High durability is understood to mean for instance that the optical indication element remains detectable for the expected service life of the component.

According to a further embodiment of the component, this is manufactured at least partially in a casting method, wherein the optical indication element is generated by a corresponding negative impression in a casting mold in order to manufacture the component.

The casting method comprises in particular a cast metal, a die casting or also an injection molding, which is preferably used with plastic. Reference can also be made to an injection molding method. The negative impression can also be referred to as negative mold and the casting mold can also be referred to as tool cavity.

In this embodiment the component advantageously requires no additional machining for providing the optical indication element, which can reduce the manufacturing costs for the component with the optical indication element.

According to a further embodiment of the component, this comprises a metal sheet, on which the optical indication element is arranged.

The fact that the optical indication element is arranged on the metal sheet is currently also understood to mean that the optical indication element is integrated into the metal sheet, for instance embossed or milled.

The metal sheet can consist of different metals and/or alloys such as aluminum, magnesium, iron, copper, nickel, zinc, chrome and suchlike.

According to a further embodiment of the component, this comprises a plastic element on which the optical indication element is arranged.

The plastic element can comprise a duroplast, an elastomer or also a thermoplast.

In embodiments, the component comprises a compound material element upon which the optical indication signal is arranged.

The compound material comprises in particular a fiber-reinforced material, which comprises at least one fiber material and a matrix material.

According to a further embodiment of the component, this comprises a glass element on which the optical indication element is arranged.

In embodiments of the component, this has one or more coatings, which can cover the optical indication element and/or into which the optical indication element can be written.

The component can have one or more coatings, wherein this is independent of the base material from which the component is formed. The coatings can be metallic, however it can also involve non-metallic coatings, for instance glass, plastic, minerals or suchlike.

The optical indication element can be arranged in different layers of the coating of the component, wherein it can comprise a different information content in the different layers. In particular, the optical indication element can be provided in this way as a hologram, for instance.

According to a further embodiment of the component, this is embodied as a replacement part for the household appliance.

A replacement part is in particular a component of the household appliance, which was mounted on the household appliance upon first delivery of the household appliance and/or is to be assembled hereon upon commissioning of the household appliance, such as for instance a door or a viewing window of a door for an oven.

According to a further embodiment of the component, this is embodied as an accessory part for the household appliance.

An accessory part is in particular a component, which is optionally provided for use with the household appliance, such as for instance a baking tray or roasting tray for an oven.

According to a further embodiment of the component, the optical indication element comprises a QR code.

A QR code is in particular a two-dimensional code, which is provided for instance in the form of a matrix comprising black and white surfaces.

According to a further embodiment of the component, the coded information comprises a reference to a data record stored in an external storage facility.

The data record comprises for instance operating instructions, repair instructions, in particular of an interactive type with images, animations and/or videos. The data record can also comprise data which is provided to overlay or superimpose into an image or video of the household appliance (augmented reality), wherein these comprise in particular a step by step instruction for use, the design or the repair of the component.

The coded information can additionally comprise an item of registration information. The registration information is used to authorize the call-up of the data record, for instance. In other words, the registration information comprises an access authorization. In this regard the registration information can be individual, in particular unique, in other words a unique assignment of the registration information to the optical indication element and thus to the component exists. Alternatively, the registration information of a number of different optical indication elements can be identical so that no unique assignment is possible.

According to a second aspect, a household appliance, in particular a household cooking appliance, is proposed with a component according to the first aspect.

The household appliance is for instance embodied as a hob, such as an electric hob, an induction hob, a gas hob and/or combinations thereof, as an oven, as a microwave appliance, as a steam cooking appliance, as a deep-fat fryer, as a food processor, as a mixer, as a barbecue grill, as a dishwasher, as a kettle, as a coffee machine, as a refrigeration appliance, as an extractor hood, as a washing machine and so on and so forth.

According to an embodiment of the household appliance, the component with the optical indication element is arranged on the household appliance such that it is visible from outside of the household appliance.

For instance, the optical indication element is arranged externally on a housing of the household appliance.

Here the term "visible" is not to be interpreted as the indication element having to be visually perceivable with the eyes.

According to a further embodiment of the household appliance, the component is arranged movably between at least two positions on the household appliance, wherein the optical indication element is not visible in the first position and is visible in a second position.

For instance, the optical indication element is arranged internally on a door of the household appliance. When the door is closed, the optical indication element is then not visible. When the door is opened, the optical indication element is then visible.

According to a further embodiment of the household appliance, this has a further component which is arranged movably between at least two positions on the household appliance, wherein in a first position of the further component, the optical indication element is not visible and in a second position of the further component the optical indication element is visible.

For instance, the optical indication element is arranged on a flange which circulates around an opening of the household appliance, wherein the further component is embodied as a door of the household appliance, which is designed to close the opening, wherein in the closed state the door covers the flange and thus also the optical indication element.

According to a third aspect, a system comprising a component is proposed for use with a household appliance, in particular a household cooking appliance and with a storage facility for storing at least one data record relating to the component. The component has an optical indication element which is arranged in a non-detachable manner on the component, wherein the optical indication element comprises a coded item of information which comprises a reference to the data record stored in the storage facility, wherein the optical indication element can be detected by means of an optical detection facility. The storage facility is designed to provide the at least one data record relating to the component as a function of a request comprising the reference.

The embodiments and features described for the proposed component according to the first aspect apply accordingly to the component of the system.

The storage facility is in particular a server which can be reached by way of a data network, for instance a mobile radio network, the Internet and suchlike. Accordingly, the storage facility is designed to provide the requested data record by way of the respective data network.

A request is understood here to mean in particular that a third appliance, in particular the optical detection facility, which can be a mobile telephone of the user, establishes a communication link with the storage facility by using the reference included in the coded information and requests the data record relating to the component. As a response to the request, the storage facility transfers the data record to the third device and/or to a fourth device, such as for instance a display apparatus which is designed to display the information relating to the component which is stored in the data record. The data record comprises for instance operating instructions, repair instructions, in particular of an interactive type with images, animations and/or videos. The data record can also comprise data which is provided to overlay or superimpose into an image or video of the household appliance (augmented reality), wherein these comprise in particular a step by step instruction for the use, the design or the repair of the component. The display apparatus can be integrated in the detection facility or also embodied as a monitor and/or smart glasses.

In embodiments, the system additionally comprises an optical detection facility. The optical detection facility is designed to detect the optical indication element and preferably to decode the coded information. Alternatively, the optical detection facility can transfer the detected optical indication element to a further unit, which is designed to decode the coded information. The further unit can comprise for instance as an application, which is executed on a mobile device or a server.

The optical detection facility is preferably further designed to request the data record relating to the component with the storage unit. To this end, the optical detection unit establishes a communication link to the storage unit, for instance, wherein parameters for manufacturing the communication link, such as an IP address or the like, are in particular an integral part of the coded information.

In further embodiments, the system comprises a display apparatus for displaying the data stored in the data record. The display apparatus can be integrated in the optical detection facility, but can also be arranged externally thereto. The display apparatus is designed to receive the data record, for instance directly from the storage unit or also indirectly by way of the optical detection facility or another receive unit, which receives the data record from the storage unit.

The system is preferably operated by means of the method according to the fourth or fifth aspect.

According to a fourth aspect, a method for providing information material relating to a component for use with a household appliance, in particular with a household cooking appliance is proposed to a user of the component. The component has an optical indication element arranged in a non-detachable manner on the component, said indication element comprising coded information relating to the component. In a first step, the optical indication element is detected by means of an optical detection facility. In a second step, the coded information contained in the optical indication element is decoded on the basis of the detected optical indication element. In a third step, the information material is requested as a function of the decoded information. In a fourth step, the requested information material is provided to the user.

The optical indication element is embodied in particular as described on the basis of the first aspect. The household appliance is embodied in particular as described on the basis of the second aspect.

The optical detection facility is for instance a digital camera or suchlike, which is integrated for instance into a mobile device of the user, in particular a smart phone.

The decoding of the coded optical information can take place for instance by the mobile device of the user, provided this has a corresponding functionality. For instance, an application which provides the functionality is provided on the mobile device. Alternatively or in addition, the detected image of the optical indication element can be transferred or transmitted to a further facility by the detection facility, wherein the further facility is designed to decode the coded information.

The provision of the information material is carried out for instance by transmitting the information material to a device of the user and displaying the transmitted information material on the device. The information material is in particular stored in a data record on a storage unit.

The embodiments and features described for the proposed component apply accordingly to the proposed method.

According to a fifth aspect, a method for providing information material relating to a household appliance, in particular relating to a household cooking appliance, is proposed to a user of the component. The household appliance comprises at least one component with an optical indication element which is arranged in a non-detachable manner on the component, which indication element comprises coded information relating to the component and/or the household appliance. In a first step, the optical indication element is detected by means of an optical detection facility. In a second step, the coded information contained in the optical indication element is decoded on the basis of the detected optical indication element. In a third step, the information material is requested as a function of the decoded information. In a fourth step, the requested information material is provided to the user.

The embodiments and features described for the proposed method according to the fourth aspect apply accordingly to the proposed method according to the fifth aspect.

The embodiments and features described for the proposed household appliance apply accordingly to the proposed method.

According to a sixth aspect, a method for operating a system comprising a component for use with a household appliance, in particular a household cooking appliance and with a storage facility for storing at least one data record relating to the component is proposed. The component has an optical indication element arranged in a non-detachable manner on the component, wherein the optical indication element comprises coded information, which comprises a reference to the data record stored in the storage facility. In a first step, the optical indication element is detected by means of an optical detection facility. In a second step, the coded information contained in the optical indication element is decoded on the basis of the detected optical indication element. In a third step, the data record is requested as a function of the decoded information. In a fourth step, the requested data record is provided to the user.

The embodiments and features described for the proposed method according to the fourth aspect apply accordingly to the proposed method according to the sixth aspect.

The embodiments and features described for the proposed system apply accordingly to the proposed method.

Further possible implementations of the invention also comprise combinations—not explicitly cited—of features or embodiments described above or below in respect of the exemplary embodiments. In this context, the person skilled in the art will also add individual aspects as improvements or enhancements to the respective basic form of the invention.

BRIEF DESCRIPTION OF THE DRAWINGS

Further advantageous embodiments and aspects of the invention form the subject matter of the subclaims and of the exemplary embodiments of the invention that are described below. The invention is described below in greater detail on the basis of preferred embodiments with reference to the attached figures.

DETAILED DESCRIPTION OF EXEMPLARY EMBODIMENTS OF THE PRESENT INVENTION

Figure 1:
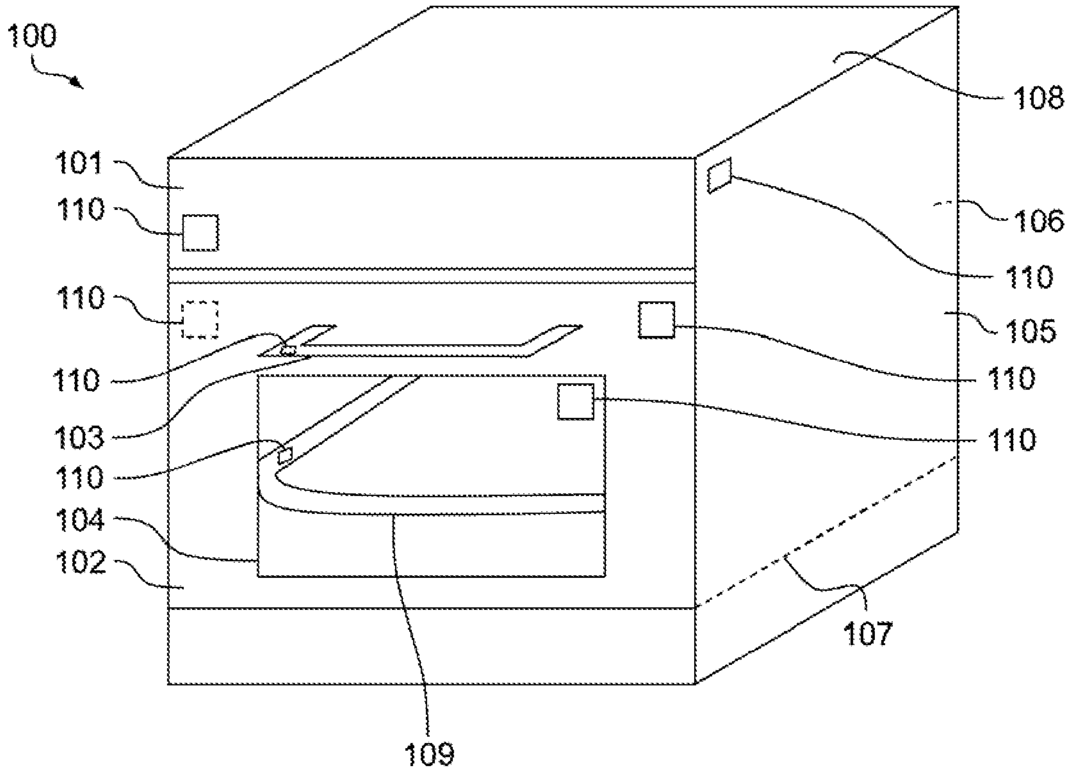
FIG. 1 shows a schematic perspective view of an exemplary embodiment of a household appliance with a plurality of components.

In the figures, elements that are identical or have the same function have been provided with the same reference characters unless otherwise stated.

FIG. 1 shows a schematic perspective view of an exemplary embodiment of a household appliance 100 with a plurality of components 101-109. In this example, the household appliance is embodied as a cooking appliance, in particular as an oven. The components 101-109 are by way of example a control element 101, which is arranged on a front of the oven 100, a door 102, which can open and close with a mechanism (not shown) and thus ensures access to a cooking chamber of the oven 100, wherein the door 102 is shown in its closed position in FIG. 1. The component 103 is a handle which is provided for opening and closing the door 102. The component 104 is a window in the door 102, which enables visual control of the item to be cooked in the cooking chamber. The components 105-108 are a side wall, a rear wall, a base and a ceiling of the oven 100. The component 109 is an accessory part which is arranged in the cooking chamber of the oven 100. The accessory part 109 can be removed in particular from the cooking chamber.

The components 101-109 can have in each case an optical indication element 110 which is connected in a non-detachable manner to the component 101-109. In the example in FIG. 1, the control element 101, the door 102, the handle 103, the window 104, the side wall 105 and a flange (without reference character) of the cooking chamber of the oven 100 have in each case an optical indication element 110. When the door 102 is closed, the optical indication element 110 of the flange is not visible and is therefore shown with a dashed line. The different optical indication elements 110 are designed differently in particular, wherein this can relate both to the manufacture of the respective optical indication element 110 and also to the coded information 112 (see FIG. 2) included therein.

A respective component 101-109 is determined for use with the household appliance 100. As apparent from the cited examples, this can be components 101-109, which are used during the manufacture of the household appliance 100 and are installed in or on the household appliance 100. The components 101-109 can be connected here in a detachable or non detachable manner with the household appliance 100. Furthermore, the components 101-109 can be replacement parts or accessory parts for the household appliance 100. By way of example, the control element 101 or also the door 102 is available as a replacement part. An example of an accessory part is the baking tray 109.

The control element 101 of the oven comprises for instance a glass plate, which is arranged on a dark metal sheet. The indication element 110 of the control element 101 can therefore be integrated both in the dark metal sheet, since it remains detectable despite the glass plate arranged in front. The indication element can be pressed and/or stamped, embossed, milled and so on and so forth onto the metal sheet. The indication element 110 can additionally or alternatively be integrated into the glass plate. Possibilities of this are screen printing, laser engraving, selective grinding and so on and so forth. In particular, in this regard the indication element can be embodied as a hologram.

The indication elements 110 of the further components 101-109 can be embodied according to the material of the respective component 101-109 and the desired or required robustness. Possibilities for manufacturing the optical indication element 110 are for instance a laser engraving method, a stylus, needle or dot-matrix method, an embossing method, an inkjet printing method, a screen printing method and/or a cutting method such as milling, grinding, boring, sawing. Furthermore, the indication element 110 can be manufactured at least partially in a casting method, providing the respective component 101-109 is suited to the manufacture. In this regard, the optical indication element 110 is manufactured by means of a corresponding negative printing in cast form, in particular an injection molded form, for manufacturing the component 101-109.

The coded information 112, which comprises the optical indication element 110, is in particular a reference to a data record, which is stored in an external storage unit 300 (see FIG. 3), in particular a server which can be reached by way of a data network. The coded information can further comprise an item of registration information, if a corresponding authorization or legitimation is requested for access to the data record.

The coded information 112 of different indication elements 110 is in particular different. For instance, different indication elements 110 contain different references which refer to different data records.

Figure 2:
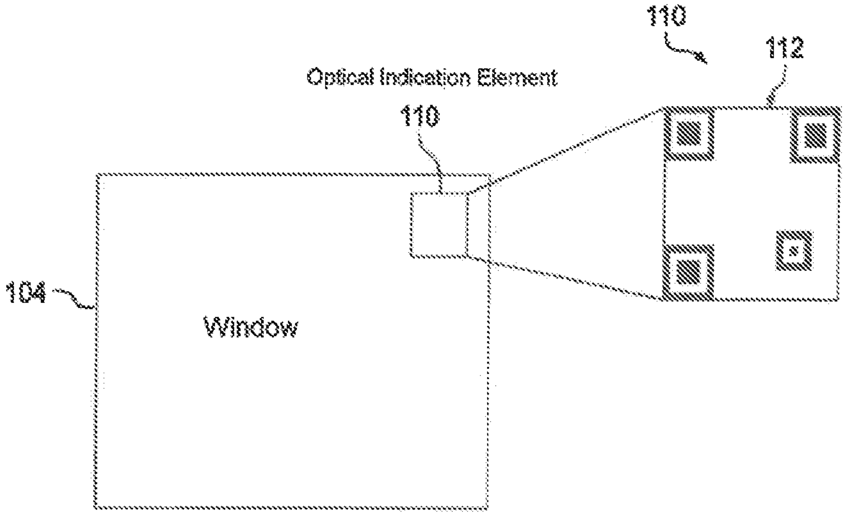
FIG. 2 shows a schematic view of an exemplary embodiment of a component with an optical indication element.

FIG. 2 shows a schematic view of an exemplary embodiment of a component 104 with an optical indication element 110. By way of example, the window 104 of the door 102 is shown here. In this example, the optical indication element 110 is permanently attached to the window 104 by means of screen printing. In this example, the optical indication element 110 is embodied as a QR code, such as is shown schematically in the detailed view. The optical indication element 110 can alternatively be embodied as a bar code or as another code. The optical indication element 110 can further comprise different code variants, for instance a bar code and a QR code.

Figure 3:
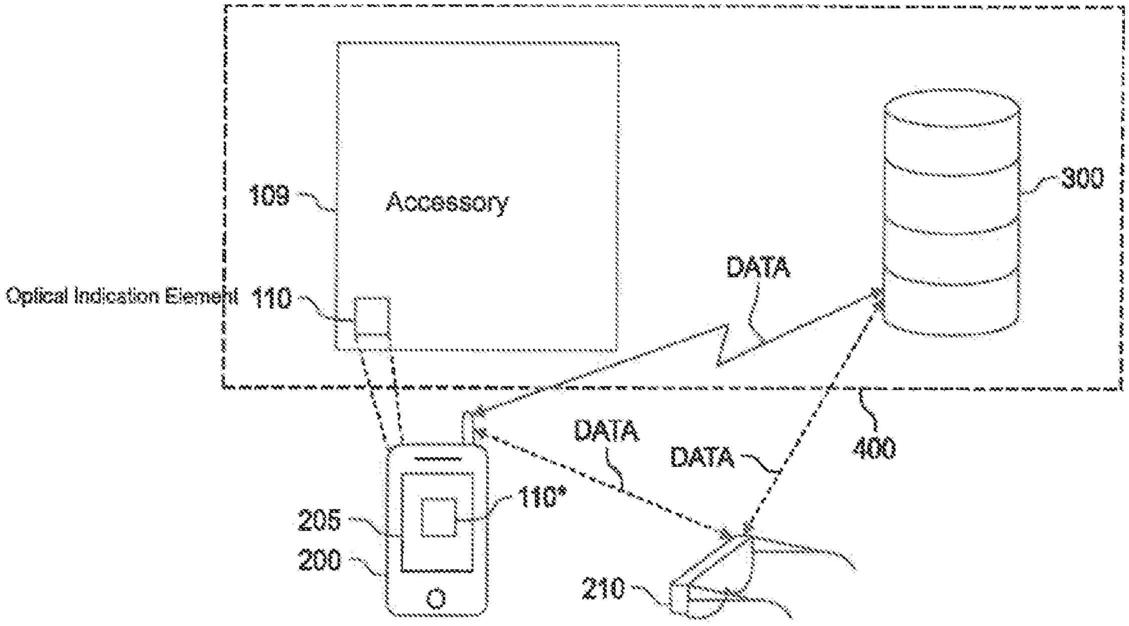
FIG. 3 shows a schematic view of an exemplary embodiment for a system comprising a component and a storage facility.

FIG. 3 shows a schematic view of an exemplary embodiment for a system 400 comprising a component 109 and a storage facility 300. The component 109 is a baking tray for an oven 100 (see FIG. 1) for instance. The baking tray 109 has an embossed optical indication element 110. The optical indication element 110 can be detected by means of an optical detection facility 200, which is embodied here by way of example as a mobile telephone. To this end, the optical indication element 110 is photographed for instance with an integrated camera of the mobile telephone 200 and thus detects an image 110* of the optical indication element 110. It should be noted that in this example the optical detection facility 200 is shown as not belonging to the system 400, in further embodiments however it can likewise be an integral part of the system 400.

The mobile telephone 200 decodes the coded information contained in the optical indication element 110 on the basis of the detected image 110*. The information comprises a reference, for instance a link, to a data record DATA relating to the baking tray 109 and stored in the storage facility 300. Using this reference, the mobile telephone 200 establishes a communication link to the storage facility 300 and requests the data record DATA herefrom. The data record DATA relating to the baking tray 109 comprises for instance references to the correct use of the baking tray 109, such as a list of compatible household appliances, cleaning instructions and/or cooking recipes, which have a preparation step using the baking tray 109. This counting is only exemplary for the baking tray 109. With other components 101-109, the data record DATA can comprise other information, in particular indications with regard to repairing or cleaning the respective component 101-109. The data record DATA can comprise text, tone, images, such as an exploded drawing and/or videos, such as an animation and suchlike.

The storage facility 300 is embodied in particular as a server, which can be reached by means of a data network, such as a LAN, the Internet and/or a mobile radio network. By way of the data network, the storage facility 300 receives the request to provide the data record DATA and also transfers the data record DATA to the respective device, for instance to the mobile telephone 200, which outputs the information contained in the data record DATA and relating to the component 101-109 on an integrated display apparatus 205 for instance. In this regard, the request can be transferred by way of a first data network and the data record DATA can be provided and/or transferred by way of a second data network (not shown). Furthermore, the facility which receives the data record DATA may be different to the facility which has made the request or has requested the data record DATA.

Optionally, a separate display apparatus 210 can be provided, which in this example is embodied as smart glasses. The smart glasses 210 can receive the data record DATA directly from the storage facility 300 or also from the optical detection facility 200. It should be noted that in this example the display apparatus 210 is shown as not belonging to the system 400, in further embodiments however it can likewise be an integral part of the system 400.

Figure 4:
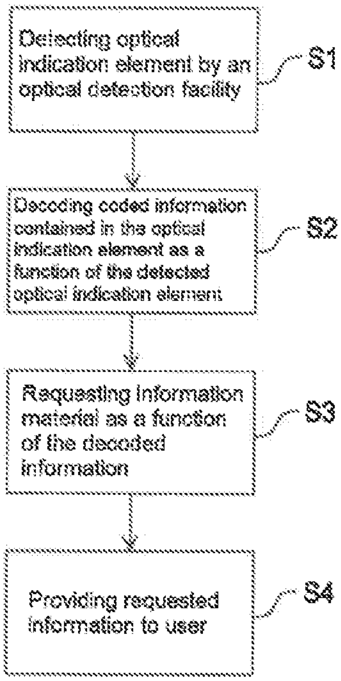
FIG. 4 shows a schematic block diagram of an exemplary embodiment of a method for providing information material relating to a component of a household appliance.

FIG. 4 shows a schematic block diagram of an exemplary embodiment of a method for providing information material relating to a component 101-109 (see FIGS. 1-3) of a household appliance 100 (see FIG. 1), in particular a household cooking appliance, to a user of the component 101-109 and/or the household appliance 100, wherein the component 101-109 has an optical indication element 110 arranged in a non-detachable manner on the component 101-109, which comprises coded information 112 (see FIG. 2) relating to the component 101-109. In a first step S1, the optical indication element 110 is detected by means of an optical detection facility 200 (see FIG. 3). In a second step S2, the coded information 112 contained in the optical indication element 110 is decoded as a function of the detected optical indication element 110. In a third step S3, the information material is requested as a function of the decoded information and in a fourth step S4 the requested information is provided to the user.

The method is preferably carried out with a system 400 as explained on the basis of FIG. 3. The component 101-109 and the household appliance 100 is embodied for instance as on the basis of FIGS. 1-3.

Although the present invention was described on the basis of exemplary embodiments, it can be modified in a variety of ways.

The invention claimed is:

1. A component for use with a household appliance, the component comprising an optical indication element arranged in a non-detachable manner on the component and comprising coded information relating to the component, said optical indication element designed for detection by an optical detection facility, wherein the component is arranged movably between at least two positions, wherein, in a first position of the least two positions of the component, the optical indication element is hidden from outside the appliance and, in a second position of the least two positions of the component, the optical indication element is visible from outside the appliance.

2. The component of claim 1 for use with a household cooking appliance as the household appliance.

3. The component of claim 1, wherein the optical indication element is manufactured using a laser engraving method, a stylus, needle or dot-matrix method, an embossing method, an inkjet printing method, a screen printing method and/or a cutting method.

4. The component of claim 1, wherein the component is manufactured at least partially in a casting method, said optical indication element being produced by a corresponding negative impression in a cast mold for manufacturing the component.

5. The component of claim 1, further comprising a metal sheet, said optical indication element being arranged on the metal sheet.

6. The component of claim 1, further comprising a plastic element, said optical indication element being arranged on the plastic element.

7. The component of claim 1, further comprising a glass element, said optical indication element being arranged on the glass element.

8. The component of claim 1, wherein the component is embodied as a replacement part for the household appliance.

9. The component of claim 1, wherein the component is embodied as an accessory part for the household appliance.

10. The component of claim 1, wherein the coded information comprises a reference to a data record stored in an external storage facility.

11. A household appliance, comprising:

a component coupled to the household appliance; and an optical indication element arranged in a non-detachable manner on the component and comprising coded information relating to the component, said optical indication element designed for detection by an optical detection facility;

wherein the component is arranged movably between a first position, wherein the optical indication element is hidden from outside the appliance, and a second position, wherein the optical indication element is visible from outside the appliance.

12. The household appliance of claim 11, embodied as a household cooking appliance.

13. The household appliance of claim 11, wherein the component and the optical indication element are arranged on the household appliance such as to be visible from outside of the household appliance.

14. The household appliance of claim 11, further comprising a further component, which is movably arranged between at least two positions on the household appliance, wherein in a third position the optical indication element is hidden from outside the appliance and in a fourth position the optical indication element is visible from outside the appliance.

15. A system, comprising:

a household appliance comprising a component coupled to the household appliance, and an optical indication element arranged in a non-detachable manner on the component and detectable by an optical detection facility, wherein the component is arranged movably between a first position, wherein the optical indication element is hidden from outside the appliance, and a second position, wherein the optical indication element is visible from outside the appliance; and a storage facility for storing a data record relating to the component, wherein the optical indication element comprises coded information, which comprises a reference to the data record stored in the storage facility, and wherein the storage facility is designed to provide the data record relating to the component as a function of a request comprising the reference.

16. The system of claim 15, wherein the household appliance is embodied as a household cooking appliance.

17. The system of claim 15, further comprising a further component, which is movably arranged between at least two positions wherein, in a third position, the optical indication element is hidden from outside the appliance and, in a fourth position the optical indication element is visible from outside the appliance.

18. A method, comprising:

moving a component used with a household appliance between a first position and a second position, wherein an optical indication element arranged in a non-detachable manner on the component is hidden in the first position and visible in the second position;

detecting by an optical detection facility the optical indication element which is arranged in a non-detachable manner on the component used with the household appliance and which comprises coded information relating to the component;

decoding the coded information contained in the optical indication element as a function of the detected optical indication element;

requesting information material as a function of the decoded information; and providing the requested information material to the user.

19. The method of claim 18, wherein the household appliance is a household cooking appliance.

* * * * *